Aug. 25, 1959
V. R. ABRAMS
2,901,225
APPARATUS FOR STERILIZING FLUID FOODS
Filed Jan. 7, 1955
3 Sheets-Sheet 1
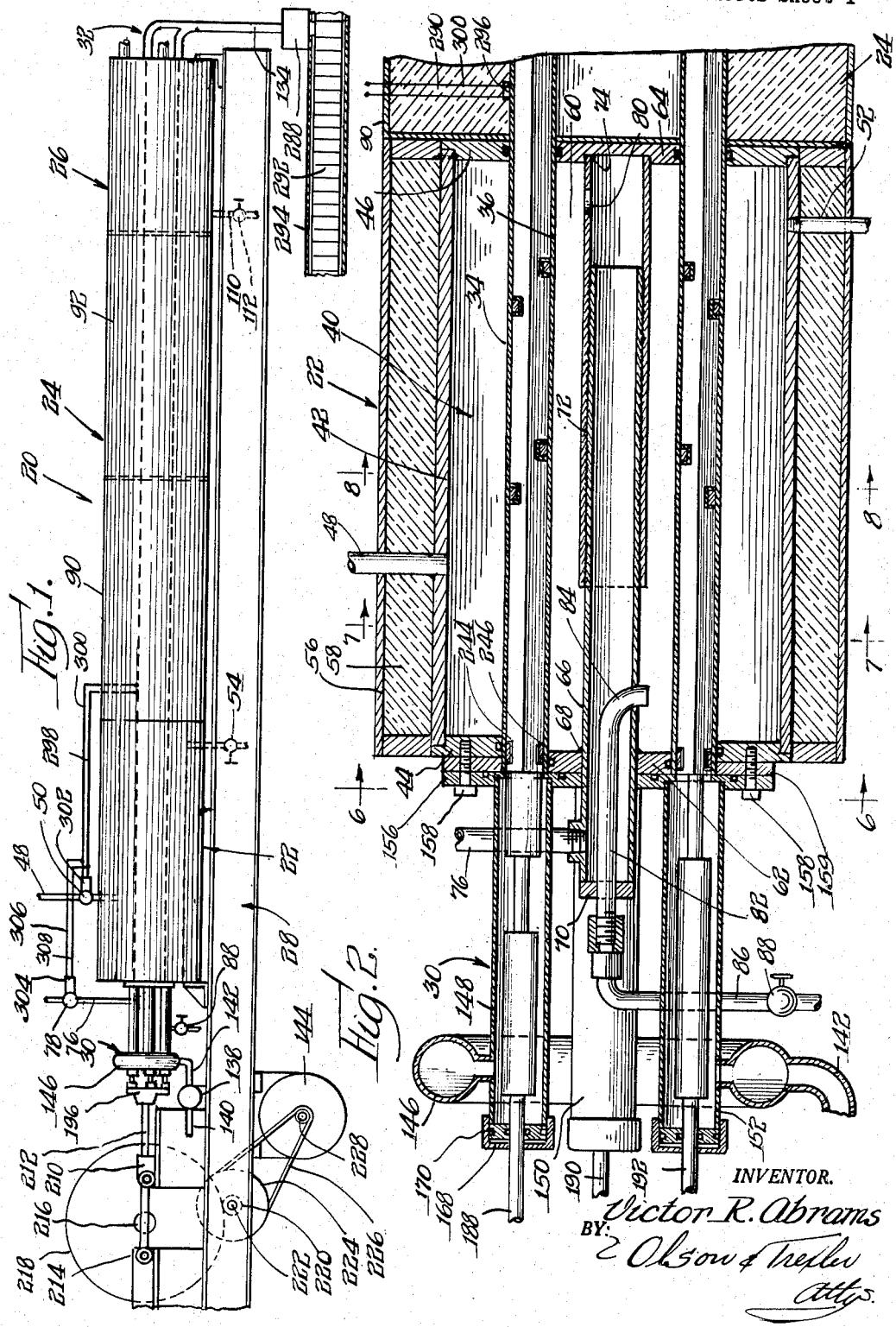
INVENTOR.
Victor R. Abrams
BY Olson & Trexler
Attys.

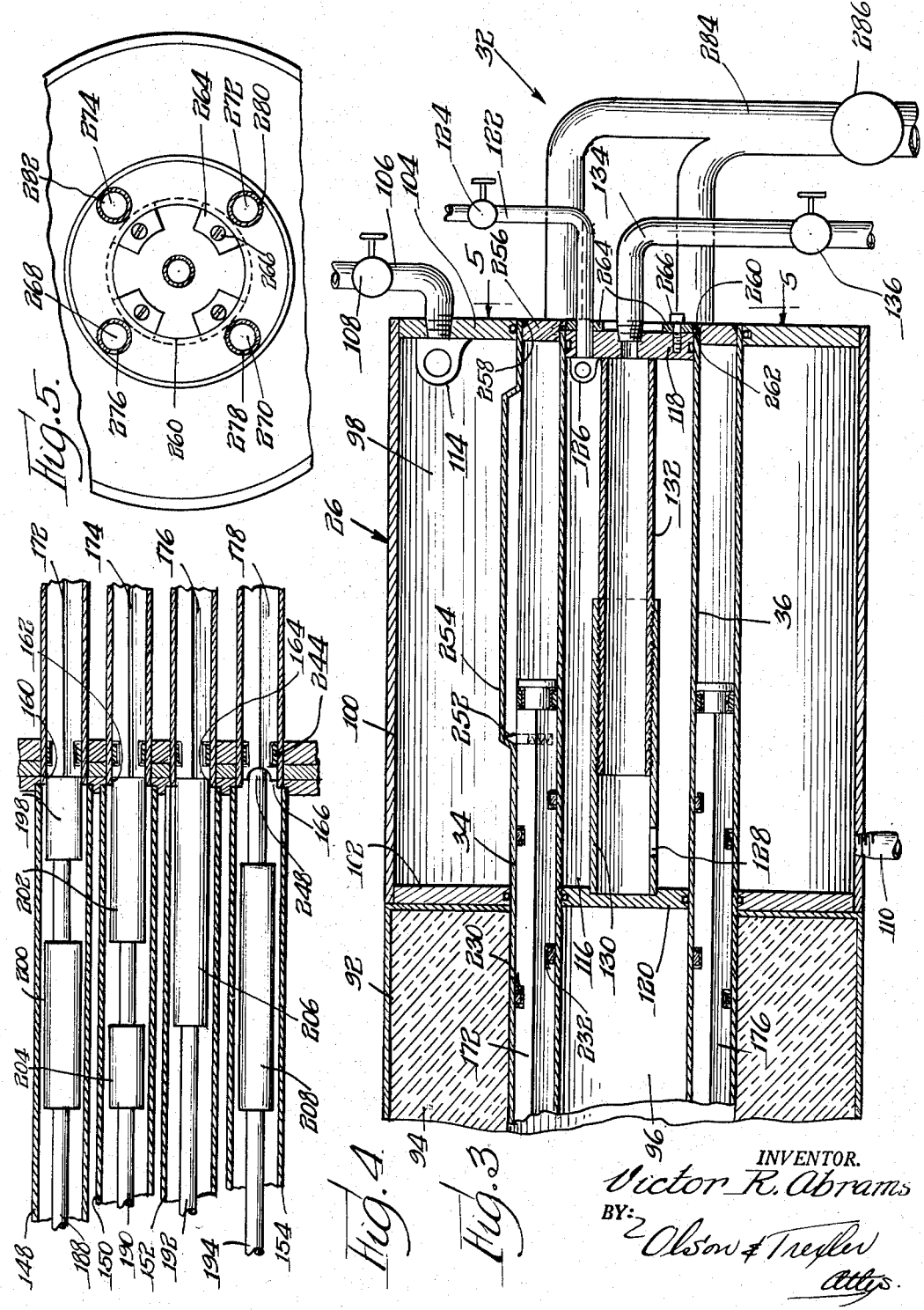

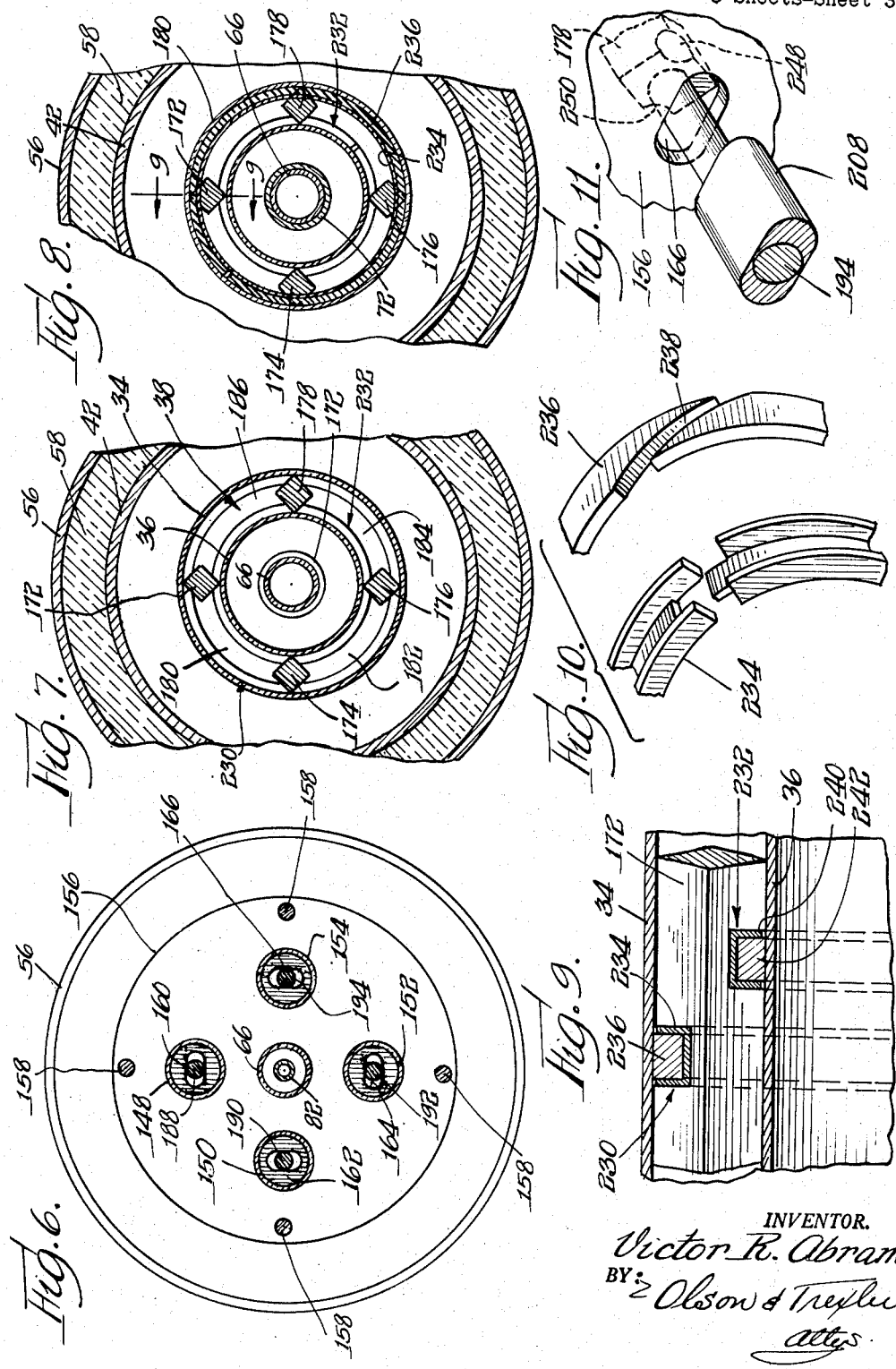

United States Patent Office 2,901,225
Patented Aug. 25, 1959

2,901,225

APPARATUS FOR STERILIZING FLUID FOODS

Victor R. Abrams, Rockford, Ill., assignor to W. F. and John Barnes Company, Rockford, Ill., a corporation of Illinois Application January 7, 1955, Serial No. 480,461

4 Claims. (Cl. 257—84)

The present invention relates to a novel apparatus for processing fluid materials and more particularly to a novel apparatus for sterilizing or similarly processing fluid food stuffs such as milk, soups, purees, juices and the like.

When sterilizing or similarly processing fluid food stuff, it is necessary to raise the temperature of the food stuff so as to destroy all of the bacteria therein so as to insure against spoilage when the food stuff is ultimately canned or otherwise packaged. It is also important to prevent overheating of the food stuff during processing thereof so that the food stuff will not be overcooked, burned or undergo any undesirable changes in taste, texture and appearance. In general, good results may be obtained by rapidly heating the food stuff to a desired temperature and then cooling the food stuff after it has been held at the desired temperature for a predetermined period of time, or in some cases, cooling the food stuff almost immediately.

Various apparatus have heretofore been suggested for carrying out this process but such apparatus have been subject to several disadvantages. For example, the fluid food stuff flows through certain apparatus heretofore in use in a manner which permits stratification and laminar flow whereby the food stuff is not evenly heated throughout so that it is difficult, if not impossible, to bring all particles of the food stuff to the desired sterilizing temperature without overheating portions of the food stuff. In addition, when such laminar flow occurs a layer of the food stuff builds up and "burns on" the wall of the conduit through which the food stuff is flowing so that the heat transferring characteristics and the capacity of the apparatus is impaired. Various attempts have been made to eliminate laminar flow and "burn on" but the apparatus resulting from such attempts have often been unduly complicated and expensive to manufacture and maintain.

An important object of the present invention is to provide a novel apparatus whereby fluid food stuffs and the like may be rapidly and uniformly heated and processed continuously in a relatively simple and economical manner.

A more specific object of the present invention is to provide a novel apparatus for heating and processing fluid materials such as food stuffs, which apparatus is constructed so as to prevent laminar flow and "burn on" whereby to insure uniform processing of all particles of the fluid material.

Another object of the present invention is to provide a novel apparatus of the above described type with means for feeding the fluid food stuff or material uniformly into all portions of a conduit in which the material is to be processed so as to promote efficient and uniform processing of the material.

Still another object of the present invention is to provide a novel apparatus of the above described type wherein cooling fluid or water is directed in a manner which promotes efficient and uniform cooling of the processed material or food stuff.

A more specific object of the present invention is to provide a novel apparatus of the above described type which may be readily assembled and disassembled for cleaning purposes or any other desired reasons and which is formed so that the various elements thereof need not be held to close tolerances whereby to promote economical production of the apparatus.

Other objects and advantages of the present invention will become apparent from the following description and the accompanying drawings wherein:

Fig. 1 is a side elevational view of an apparatus embodying the principles of this invention;

Fig. 2 is an enlarged fragmentary vertical sectional view of the feeding and heating portions of the apparatus;

Fig. 3 is an enlarged fragmentary vertical sectional view of the holding, cooling and discharge portions of the apparatus;

Fig. 4 is a diagrammatic sectional view of the feeding portion of the apparatus;

Fig. 5 is a fragmentary cross sectional view taken along line 5—5 in Fig. 3;

Fig. 6 is a cross sectional view taken along line 6—6 in Fig. 2;

Fig. 7 is a cross sectional view taken along line 7—7 in Fig. 2;

Fig. 8 is a fragmentary cross sectional view taken along line 8—8 in Fig. 2;

Fig. 9 is an enlarged fragmentary sectional view taken along line 9—9 in Fig. 8;

Fig. 10 is a fragmentary exploded perspective view of a scraper ring assembly forming a part of the apparatus of this invention; and Fig. 11 is a fragmentary perspective view of a portion of the novel means for controlling the feed of fluid material into the heating section of the apparatus.

Referring now more specifically to the drawings wherein like parts are designated by the same numerals throughout the various figures, an apparatus 20 embodying the principles of the present invention is shown in Fig. 1 and includes elongated means through which the fluid material or food stuff to be processed is passed and which includes a heating section 22, a holding section 24 and a cooling section 26. This elongated means may be mounted on any suitable support structure such as an elongated horizontally disposed frame member 28. Means 30 is provided for feeding the fluid material to be processed into the heating section, and means 32 is provided for receiving fluid discharged from the cooling section and controlling the rate at which the fluid material is discharged.

The elongated processing means includes a pair of concentric tubes 34 and 36 disposed to provide an annular chamber 38 therebetween. As set forth more fully hereinbelow, a fluid material to be processed is directed through this annular chamber continuously and is heated to and maintained at the desired processing temperature and finally cooled before being discharged.

As shown best in Fig. 2, the heating section 22 comprises a steam chest 40 surrounding the outer tube 34 and provided by a cylindrical shell 42 and annular end plates 44 and 46 which are welded or otherwise secured to the shell and which closely confine the tube 34. Preferably, the end plates 44 and 46 are formed so that they may be removably slipped over the tube 34 and any suitable sealing means is provided on the inner margins of the end plates to prevent the escape of steam between the end plates and the tube. An inlet conduit 48 is provided for admitting steam into the chamber 40 and a valve 50 is preferably provided in the conduit 48 for controlling the entry of steam. A steam outlet conduit 52 communicates with the chamber 40 at a point disposed at the opposite side of the chamber from the inlet conduit and adjacent one end of the chamber spaced farthest from the inlet conduit so as to promote even distribution of the steam throughout the chamber. A valve 54 is provided in the outlet conduit 52 whereby the pressure and, therefore, the temperature of the steam within the chamber 40 may be readily controlled. While steam is preferably used for the heating medium within the chamber 40, it is understood that, if desired, other heating fluids may be used. In order to reduce heat loss from the chamber 40 and to protect workmen, the steam chest is enclosed by a cannister 56 containing insulating material 58.

As will be understood, heat is transferred from the chamber 40 through the tube 34 and into the fluid material being processed in the annular chamber 38. In order to promote uniform heating of the fluid material, a steam chest 60 is disposed within the inner tube 36. This steam chest is provided by a pair of disks 62 and 64 which fit snugly within the tube 36 and which have suitable sealing means on their peripheries. A pipe 66 extends through the disk 62 and is welded thereto as at 68, which pipe has its outer end enclosed by a cap 70 welded thereto. An inner end portion of the pipe 66 extends within a second pipe 72 which is welded to the disk 64 as at 74. Preferably, the pipes 66 and 72 are provided with mating screw threads so that the distance between the disks 62 and 64 and, therefore, the length of the steam chest 60 may be adjusted. In order to introduce steam or any other desired heating fluid into the chamber 60, an inlet conduit 76 having a control valve 78 therein communicates with the outer end portion of the pipe 66 and a port 80 is provided in the upper side of the pipe 72 adjacent the disk 64. A steam outlet is provided by a relatively small diameter pipe 82 which extends through the plug 70 into the pipe 66 and has a curved end portion 84 which projects through an aperture in the wall of the pipe 66 and opens into an outer end portion of the chamber 60. A conduit 86 is connected with the outer end of the pipe 82 by a suitable coupling and a control valve 88 is provided in the conduit. With this structure it is seen that steam or any other heating fluid which is introduced through the pipe or conduit 76 into the pipe 66 enters the upper inner portion of the steam chamber 60 through the port 80, then spreads substantially uniformly throughout the chamber and finally passes out through the pipe 82.

As the heated fluid material flows through the holding section 24 of the apparatus it is desired that the temperature of the material be maintained substantially constant. Therefore, in this section of the apparatus, the concentric tubes are surrounded by one or more cannisters 90 and 92 containing suitable insulating material 94. These cannisters of insulating material substantially reduce the rate of heat loss through the outer tube 34, and a dead air space 96 is provided within the inner tube 36 so as to eliminate substantially heat loss through this tube. As will be understood, the length of the holding section may be varied by using different numbers of insulating cannisters or insulating cannisters of different lengths.

The cooling section 26 of the apparatus is shown best in Fig. 3 and includes a chamber 98 adapted to contain a body of cooling fluid such as water and provided by a cylindrical shell 100 and annular end plates 102 and 104 welded or otherwise fixed to the shell and snugly encircling the outer tube 34. Suitable sealing means is provided around the inner margins of the end plates to prevent the escape of the cooling fluid between the end plates and the tube 34. The cooling fluid or water is directed into the chamber 98 by a conduit 106 having a control valve 108 therein and an outlet conduit 110 having a control valve 112 therein communicates with the chamber 98 adjacent the end thereof opposite from the inlet conduit. In order to obtain a rapid and efficient cooling action, the cooling water is circulated rapidly within the chamber 98. This is accomplished by providing a nozzle 114 within the chamber, which nozzle communicates with the inlet conduit 106 and is formed so as to direct the cooling fluid substantially tangentially into the chamber. Thus, the cooling fluid or water tends to rotate rapidly within the chamber and such rotation is promoted by adjusting the inlet and outlet control valves 108 and 112 and forming the nozzle so that the water undergoes a substantial pressure drop as it is discharged from the nozzle.

The cooling section 26 is also provided with a water chamber 116 within the inner tube 36 in order to obtain more uniform cooling of the fluid material or food being processed. The chamber 116 is provided by a pair of disks 118 and 120 which fits snugly within the tube 36 and have suitable sealing means formed about their peripheries. A water inlet conduit 122 having a control valve 124 therein communicates with a nozzle 126 fixed on the outer disk 118. The nozzle 126 is similar to the above described nozzle 114 so that the cooling water is directed substantially tangentially within the chamber 116 in order to obtain rapid circulation or rotation of the water within the chamber. Cooling water escapes from the chamber 116 through a port 128 in a pipe 130 welded or otherwise fixed to the disk 120. The pipe 130 is telescopically associated with a pipe 132 which is welded or otherwise secured to the disk 118 and which communicates through a suitable aperture in the disk 118 with an outlet conduit 134 having a control valve 136 therein. If desired, the pipes 130 and 132 may be provided with mating threads so that the distance between the disks 118 and 120 and, therefore, the length of the chamber 116 may be adjusted.

The feeding means 30 and elements thereof are shown in Figs. 1, 2, 4 and 6 through 11. This means includes a pump 138 which, for example, may be a pump of known construction. The pump has an inlet connected by a conduit 140 to a source, not shown, of the fluid material or food to be processed and an outlet connected with a conduit 142. The pump is adapted to be continuously driven by an electric motor 144 through a suitable arrangement of gears or pulleys, not shown, or by another electric motor, not shown, connected directly therewith. The conduit 142 is connected with an annular manifold 146 which, in turn, communicates with a plurality of cylinders 148, 150, 152 and 154. A plate member 156 covers the ends of the tubes 34 and 36 and is secured in place by a plurality of screws 158 which are threaded into an annular collar 159 welded to the tube 34 and into the end plate 44 of the steam chest 40. As shown best in Fig. 6, the cover plate 156 is provided with a plurality of generally oval openings 160, 162, 164 and 166 which are circularly arranged so as to communicate with the four quadrants of the annular passage 38 between the tubes 34 and 36. The cylinders 148 through 154 have their ends welded or otherwise secured to the cover plate 156 in communication with the oval openings 160 through 166, respectively. Thus, it is seen that the fluid material from the pump 138 passes into the manifold and from the manifold into each of the cylinders and finally into each quadrant of the elongated annular passageway 38. Of course, the outer end of each of the cylinders is closed by suitable means such as a cap 168 and a packing 170.

As will be understood, the fluid material or food under pressure tends to flow along a path of least resistance through the apparatus so that, for example, the fluid flowing through one quadrant of the elongated annular passageway 38 might flow faster than the remaining fluid whereby uniform processing of all of the fluid material would be impossible. However, in accordance with the present invention, this tendency is substantially eliminated by arranging a plurality of elongated rods 172, 174, 176 and 178 within the passageway 38 to divide the relatively large passageway 38 into a plurality of relatively small passageways 180, 182, 184 and 186, and by first directing the fluid into certain of said passageways and then into other of the passageways. To accomplish this, valve means are provided in the cylinders to successively open and close the oval apertures or openings 160 through 166 so that the pressure created by the pump 138 is concentrated for injecting the fluid material into only a portion of the passageways 180 through 186 at a time. More specifically, a plurality of valve stems 188, 190, 192 and 194 extend into the cylinders 148 through 154, respectively, as shown best in Figs. 2 and 4 and have their outer ends connected to a single cross head 196 as shown in Fig. 1. A pair of valve members 198 and 200 are fixed on the stem 188 and similar valve members 202 and 204 are fixed on the stem 190. A single elongated valve member 206 is fixed on the stem 192 and another elongated valve member 208 is fixed on the stem 194. All of these valve members are generally oval shaped in transverse cross section so that they may slide through and close the generally oval shaped openings 160 through 166. All of the valve stems are reciprocated in unison by means described below and, as shown best in Fig. 4, the valve members are arranged so as to permit the flow of fluid material through only one of the oval shaped openings or apertures at a time. Thus, with the valve stems in position shown, the openings 160, 162 and 164 are closed while the opening 166 is unobstructed. Upon movement of the valve stems toward the right as viewed in Fig. 4, the valve member 198 passes completely through the aperture 160 to permit fluid to flow through this aperture while at the same time, the valve member 208 advances to close the aperture 166 and the apertures 162 and 164 remain closed by the valve members 202 and 206. Upon further movement of the valve members toward the right, the valve member 200 again closes the aperture 160 and the valve member 202 passes completely through the aperture 162 to open this aperture while the remaining apertures remain closed. Upon still further movement of the valve members toward the right, the valve member 204 advances to again close the aperture 162 and the valve member 206 passes completely through the aperture 164 to permit passage of fluid therethrough while the remaining apertures remain closed. Then just before the valve members 200, 204 and 208 pass completely through their associated apertures, the direction of movement of the valve stems is reversed, and as will be apparent, the apertures are again successively closed and opened in reverse order.

Any suitable mechanism may be provided for reciprocating the valve stems and, as shown in Fig. 1, this mechanism may include a slide 210 which is connected to the cross head 196 by a rod 212 and which is also connected to a crank shaft 214 by a rod 216. A large gear 218 is fixed on one end of the crank shaft and is driven by a pinion 220 fixed on a rotatably mounted shaft 222. A pulley 224 is also mounted on this shaft and is driven from the electric motor 144 by means of a belt 226 passing therearound and also around a pulley 228 mounted on the motor shaft.

While the above described structure which divides the annular passageway 38 into a plurality of smaller passageways and which provides for feeding the fluid material successively into certain of the smaller passageways promotes uniform flow of fluid throughout the entire annular passageway 38, laminar flow may develop in each of the relatively small passageways. In addition, there is a tendency for layers of the fluid material or food to build up and "burn on" the walls of the tubes 34 and 36. In accordance with a feature of the present invention, the apparatus is provided with means for substantially eliminating laminar flow of the fluid material and for preventing the fluid material or food from depositing and burning on the walls of the tube so that substantially uniform treatment of all of the food particles being processed is obtained. This means includes the above mentioned rods 172, 174, 176 and 178 which are respectively welded or otherwise secured to the valve stems 188, 190, 192 and 194 so that they reciprocate with the valve stems. A plurality of scraper ring assemblies 230 encircle the rods at spaced intervals for scraping the wall of the tube 34 and preventing deposits of the fluid food from building up on this wall, and a plurality of scraper ring assemblies 232 is connected with the rods for scraping the wall of the tube 36. As shown best in Figs. 9 and 10, each of the assemblies 230 includes a split metal ring 234 having a channel shaped transverse cross section and adapted to be snapped into suitable notches formed in the outer edges of the rods. A ring 236 formed from any suitable material such, for example, as a plastic material such as Teflon or the like is assembled within the ring 234 and projects radially outwardly therefrom for scraping contact with the tube 34. The plastic ring 236 is split as at 238 in a direction extending diagonally of its axis so that its end portions overlap each other to prevent an interruption in the scraping action. The inner scraping ring assembly 232 also includes a split metal ring 240 having a channel shaped transverse cross section and a split plastic ring 242. By forming the scraper in this manner it is unnecessary to hold either the rings or the tube diameters to close tolerances whereby economical manufacturing of the apparatus is promoted. In addition, the resilient split plastic rings will expand or contract to allow for any relative thermal expansion between the parts of the apparatus.

As shown in Figs. 2, 3 and 9, the ring assemblies 230 and 232 have considerable radial thicknesses and are spaced slightly axially from each other. Thus, as the rings are reciprocated with the rods, they tend to pump the fluid material within the annular passageway, but since the passageway is completely filled with the fluid material, no movement of the liquid material is obtained as a result of this piston action except for a flow relative to the rings. Thus, as the rings are reciprocated, all of the fluid material or food in front of the rings is scraped from the tube surfaces and is caused to flow relatively over and between the inner and outer rings at an increased velocity which causes turbulent mixing of the fluid material. Therefore, the rings serve not only to prevent the build-up of a boundary layer of the fluid material or food on the tube surface but also to eliminate laminar flow whereby uniform heating of the fluid material is obtained. However, it should be noted that the rings mix or blend only local portions of the liquid or in other words, no substantial mixing takes place between liquid portions which are spaced longitudinally from each other within the tubes. Thus, all portions of the liquid are heated and cooled substantially the same length of time.

Adjacent the opposite ends of the rods there are provided outer ring assemblies 244 and inner scraper ring assemblies 246 which are in radial alignment so that the terminal ends of the walls of both the tubes 34 and 36 may be scraped. The ring assemblies 244 and 246 are respectively substantially similar to the ring assemblies 230 and 232 except that since they are in radial alignment, they are formed with reduced radial thicknesses to permit the fluid material to flow more freely therebetween. Since with the valve members and rods in the position shown in Fig. 4, the rectangular end of the rod 178 and the ring assemblies 246 and 244 would substantially block the aperture 166, the end of the rod is cut away as indicated at 248 and 250 (see Figs. 4 and 6) in order to unblock the aperture. While any desired number of scraping rings may be spaced along the rods, it is understood that the distance between each of the outer scraper ring assemblies and the distance between each of the inner scraper ring assemblies should be less than the length of the stroke of the rods so that all portions of the tube walls will be scraped.

As the rods reciprocate within the annular passageway 38, they may tend to twist within the passageway so as to cause jamming of the apparatus. The ends of the rods which are secured to the valve stems are retained against such twisting by the valve stems. In order to prevent the opposite ends of the rods from twisting, a protuberance 252 which may be in the form of a pin or a screw is fixed adjacent the end of one of the rods such as the rod 172. The protuberance or pin 252 projects into a bead or rib 254 which is formed in the wall of a tube 34 so that the pin sliding within the channel formed by the bead serves to prevent the end of the rod 172 from twisting or slipping circularly around the axis of the tubes. Since the remaining rods are fixed with respect to the rod 172 by the scraper ring assemblies, this structure serves to prevent all of the rods from twisting.

The means 32 for controlling the discharge of the processed fluid material or food from the annular passageway 38 is shown in Figs. 1 and 3. This means includes an annular plate 256 which is welded to the end of the tube 34 as at 258 and which fits snugly around the end of the tube 36 for sealing the end of the annular passage 38. The plate member 256 is provided with a radially inwardly extending flange 260 which is adapted to cooperate with lugs 262 of a plurality of keeper members 264, each of which keeper members is secured to the disk 118 by a screw 266. With this structure, the annular plate 256 which is fixed to the tube 34 cooperates with the above mentioned collar 159 which is also fixed to the tube 34 and the end plate 156 to retain the tubes 34 and 36 in assembled relationship. However, it will be appreciated that this structure enables the tubes 34 and 36 to be disassembled easily for cleaning or any other desired purpose.

The annular plate member 256 is provided with a plurality of apertures 268, 270, 272 and 274 which are in alignment with the passageways 180 through 186, respectively. A plurality of conduits 276, 278, 280 and 282, respectively, communicate with the apertures 268 through 274 to direct the processed fluid material or food discharged through these apertures to a relatively large conduit or manifold 284. Suitable means such as a relief valve 286 or a back pressure pump is provided in the conduit 284 for controlling the pressure of the fluid material within the apparatus.

While various uses for the apparatus disclosed will suggest themselves, the apparatus is especially adapted for use in aseptic canning of fluid foods or flowable agglomerates. When the apparatus 20 is to be used in an aseptic canning process, the discharge conduit or manifold 284 is connected directly with a dispensing device 288 which is shown diagrammatically in Fig. 1 and which may be of any known construction. A conveyor 290 of known construction is disposed beneath the dispensing device for advancing a series of cans or other containers 292 to a filling position beneath the nozzle of the dispensing device. As will be understood, the cans or containers are sterilized by suitable means, not shown, before they reach the filling position and they are maintained in a sterile condition by enclosing the conveyor in an elongated housing 294 and providing a sterile atmosphere within the housing.

A brief resume of the operation of the apparatus 20 is as follows: The control valves 50 and 54 for the steam chest 40 and the control valves 78 and 88 for the steam chest 60 are first set to admit and maintain steam into the steam chests at substantially the desired temperature and pressure which is necessary to heat the fluid food being processed to the desired temperature. In order to provide a continuous automatic control over the temperature of the fluid food being processed, a thermocouple 296 is mounted on the wall of the tube 34 adjacent the entering end of the holding section of the tube, which thermocouple is connected by wires 298 and 300 to a device 302 of any known construction that is capable of adjusting the valve 50 in accordance with the temperature indicated by the thermocouple. In addition, an electrical device 304 for controlling the inlet valve 78 is connected in parallel with the device 302 by wires 306 and 308. With the steam control valve adjusted and the fluid food pump 138 and the motor 144 in operation, the fluid food is continuously fed into and forced through the annular space between the tubes 34 and 36 in the manner described above. As the fluid food enters between the tubes 34 and 36, it is continuously mixed and rapidly heated uniformly throughout to the desired temperature. The temperature to which the fluid food is heated depends on not only the amount of steam introduced in the steam chest but also upon the rate of flow of the fluid food through the heating section and this rate of flow may be easily controlled by adjusting the rate of discharge from the pump 138. The relief valve should be adjusted so that the pressure of the fluid food within the apparatus is greater than the pressure at which the food will boil or vaporize when heated to the desired processing temperature. As the fluid food leaves the heating section, it is maintained substantially at the desired processing temperature while it flows through the holding section and it is then cooled rapidly in the cooling section to avoid overcooking and injury thereto. Finally, the fluid food is discharged into the manifold or conduit 284 and through the relief valve 286 from where it may be directed to the dispensing device 288 or any other desired point.

From the above description, it is seen that the present invention fully satisfies the objects heretofore set forth. More specifically, it is seen that in accordance with the present invention, fluid foods and the like may be continuously and uniformly processed in an economical manner without danger of overprocessing or heating certain portions of the fluid material or food and underprocessing or heating other portions of the food. It is also seen that the present invention has provided a novel apparatus of relatively simple and economical construction which eliminates laminar flow and "burn on" so that the fluid food may be uniformly processed. It is also seen that in accordance with the present invention, a unitary apparatus has been provided which is capable of not only heating the fluid food to a desired temperature and holding the food at that temperature but which is also capable of cooling the processed food.

While the preferred embodiment of the present invention has been shown and described herein, it is obvious that many structural details may be changed without departing from the spirit and scope of the appended claims.

The invention is claimed as follows:

1. In an apparatus for processing fluid material, the combination comprising means providing an elongated passageway having an annular transverse section, means including a plurality of elongated members extending longitudinally of and circularly arranged in said passageway and substantially separating a plurality of longitudinally extending and circularly arranged portions of said annular passageway from each other for providing a plurality of substantially independent paths of travel through said passageway, fluid material feeding means adjacent an inlet end of said passageway, said feeding means including means for receiving fluid material under pressure and valve means for successively admitting fluid from said receiving means into said passageway portions, and means encircling and disposed within said annular passageway for heating fluid material therein.

2. In an apparatus for processing fluid material, the combination comprising means providing an elongated passageway having an annular transverse section, means including a plurality of elongated members extending longitudinally of and circularly arranged in said passageway and substantially separating a plurality of longitudinally extending and circularly arranged portions of said annular passageway from each other for providing a plurality of substantially independent paths of travel through said passageway, fluid material feeding means adjacent an inlet end of said annular passageway, said feeding means including means for receiving fluid material under pressure, and valve means for successively admitting fluid material from said receiving means into said passageway portions, means encircling and disposed within said annular passageway for heating fluid material therein, and means in said annular passageway for continuously mixing fluid material and for scraping inner and outer walls of the passageway to promote uniform processing of the fluid material.

3. In an apparatus for processing fluid material, the combination comprising means providing an annular transverse section, a plurality of elongated members extending longitudinally of and circularly arranged in said annular passageway and substantially separating circularly arranged portions of the passageway from each other for providing a plurality of substantially independent paths of travel through said passageway, feeding means adjacent an inlet end of said passageway, said feeding means including valve means for successively admitting fluid material under pressure into said passageway portions, said valve means being disposed for reciprocable movement and said elongated members being interconnected with said valve means for reciprocable movement therewith, means adjacent said annular passageway for heating fluid material therein, and a plurality of ring means in said annular passageway and movable with said elongated members for mixing the fluid material and for scraping inner and outer walls of said annular passageway to promote uniform processing of the fluid material.

4. In an apparatus for processing food material, the combination comprising means providing an elongated substantially straight passageway, means including a plurality of elongated members extending longitudinally of and circularly arranged in said passageway and substantially separating a plurality of longitudinally extending and circularly arranged portions of the passageway from each other for providing a plurality of substantially independent straight paths of travel having longitudinal axes parallel to each other and to the longitudinal axis of said passageway, means for successively feeding food material to be processed into said passageway portions, means adjacent said passageway for heating the food material therein, and reciprocable means within said passageway for continuously mixing the food material and for scraping walls of the passageway to promote uniform processing of the food material.

References Cited in the file of this patent

UNITED STATES PATENTS

| | | |
|---|---|---|
| 605,738 | Moyet | June 14, 1898 |
| 1,859,147 | Kuczynski | May 17, 1932 |
| 1,949,374 | Johnson | Feb. 27, 1934 |
| 1,971,314 | Lauenstein | Aug. 21, 1934 |
| 1,993,264 | Duttweiler | Mar. 5, 1935 |
| 2,054,500 | Grapengeter | Sept. 15, 1936 |
| 2,186,077 | Noyes | Jan. 9, 1940 |
| 2,401,077 | Johnston | May 28, 1946 |
| 2,808,235 | Sollich | Oct. 1, 1957 |